US006456946B1

(12) United States Patent
O'Gorman (10) Patent No.: US 6,456,946 B1
(45) Date of Patent: Sep. 24, 2002

(54) SYSTEM AND METHOD FOR MOTOR FAULT DETECTION (75) Inventor: Patrick A. O'Gorman, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/513,648

(22) Filed: Feb. 25, 2000

(51) Int. Cl.$^7$ ................................................. H02P 1/00
(52) U.S. Cl. ........................................... 702/58; 702/59
(58) Field of Search ........................... 318/638; 702/185, 702/183, 58, 59, 64, 65, 66, 75, 76, 189, 190

(56) References Cited

U.S. PATENT DOCUMENTS

| | | | |
|---|---|---|---|
| 3,824,430 A | | 7/1974 | Hentschel |
| 4,197,532 A | | 4/1980 | Lawson, III |
| 4,251,846 A | | 2/1981 | Pearson et al. |
| 4,542,432 A | | 9/1985 | Nichols, III et al. |
| 4,682,263 A | | 7/1987 | Gradnitzer et al. |
| 4,761,703 A | | 8/1988 | Kliman et al. |
| 5,255,755 A | * | 10/1993 | Fu .............................. 318/371 |
| 5,309,349 A | | 5/1994 | Kwan |
| 5,475,293 A | * | 12/1995 | Sakai et al. .................. 318/802 |
| 5,488,281 A | * | 1/1996 | Unsworth et al. ........... 318/805 |
| 5,552,684 A | * | 9/1996 | Wada et al. ................. 318/293 |
| 5,612,629 A | | 3/1997 | Mullin et al. |
| 5,861,725 A | * | 1/1999 | Endo et al. .................. 318/434 |
| 6,137,418 A | * | 10/2000 | Zuercher et al. ............ 340/648 |

FOREIGN PATENT DOCUMENTS

| | | | |
|---|---|---|---|
| JP | 61-258646 | * | 11/1986 |
| WO | WO 88/06546 | * | 9/1988 |
| WO | WO 98/10971 | * | 3/1998 |

OTHER PUBLICATIONS

Craig et al., "A Fault Detection Procedure for Single Phase Bridge Converters", EPE '93, pp. 466–471.
Blaaberg et al., "Single Current Sensor Techniques in the DC Link Three–Phase PWM–VS Inverters: A Review and a Novel Solution", IEEE Trans. Ind. Apps., Sep./Oct. 1997, pp. 1241–1253.

* cited by examiner

*Primary Examiner*—Marc S. Hoff
*Assistant Examiner*—Craig Steven Miller
(74) *Attorney, Agent, or Firm*—Gary J. Cunningham; Thomas V. Miller (57) ABSTRACT

A system that detects a motor fault includes a current sensor, a filter, and a controller. The sensor is electrically connected to the filter. A controller tunes the filter to a rotational frequency of a motor and compares a filtered signal to a predetermined value. A method that detects the motor fault condition selects an output signal conditioned by either a band pass filter or a low pass filter and compares the selected output to a predetermined value to identify a motor fault.

30 Claims, 6 Drawing Sheets

SYSTEM AND METHOD FOR MOTOR FAULT DETECTION

FIELD OF THE INVENTION

This invention relates to monitoring systems, and more particularly, to a system and a method that detects motor faults.

BACKGROUND OF THE INVENTION

Automobiles are steered by a system of gears and linkages that transmit the turning motion of the steering wheel to the front wheels. As automobile designs shift weight to the front wheels to improve riding comfort and vehicle handling, more effort is needed to turn the front wheels and provide sufficient torque to overcome the drag that exists between the front wheels and the road.

Power steering systems are designed to reduce steering effort and improve maneuverability. Some vehicles use engine driven hydraulics to amplify the torque applied by the steering wheel to the front wheels. A mechanically-driven or an electrically-driven pump maintains a hydraulic fluid, such as oil, under pressure. The rotation of the steering wheel actuates a valve, which supplies or drains fluid to a power cylinder, which reduces the steering effort needed to turn the wheels.

Some vehicles mechanically couple an electric motor to the steering shaft through steering gears. Variable torque assist levels can be realized when speed sensitive controllers alter the required torque to maneuver a vehicle based on vehicle speed. By maintaining a threshold torque that must be overcome to turn the wheels, the system impedes the front wheels from turning when a driver inadvertently tugs the steering wheel because of rough road conditions, a flat tire, or other mechanical failures.

The power steering systems described above aide the steering of automobiles at high and low speeds. However, under some circumstances, when a motor fails, the driver must overcome the additional torque of the motor failure, and if hydraulics are used, steer the fluid that couples the steering wheel to the front wheels. This may happen, for example, when a motor shorts, a motor circuit opens, or other motor faults occur. The present invention is directed to a system and a method that detects a motor failure so that the motor can be separated from the steering system when a fault occurs.

DETAILED DESCRIPTION OF THE PRESENTLY PREFERRED EMBODIMENTS

Power steering systems are designed to reduce the torque required to turn the wheels of a vehicle. To make steering easier, many power steering systems use an electric current motor that amplifies the torque applied to the steering wheel to turn the front wheels of a vehicle. A motor can often reduce the amount of work required to maneuver an automobile especially at low speeds. However, when a motor fails, steering can require considerable effort to overcome the resistance of a shorted or open circuit motor and the drag that exists between the tires and the road. While systems and methods have been designed to separate a failed motor from a steering system by electrical or mechanical means, the systems and methods must first identify when a fault occurs. The disclosed system and method detect a motor fault, such as for example, when a short or an open circuit occurs. The system and method can be easily integrated or interfaced to any front, rear, or all wheel drive power steering system that uses a direct or an alternating current motor.

Figure 1:
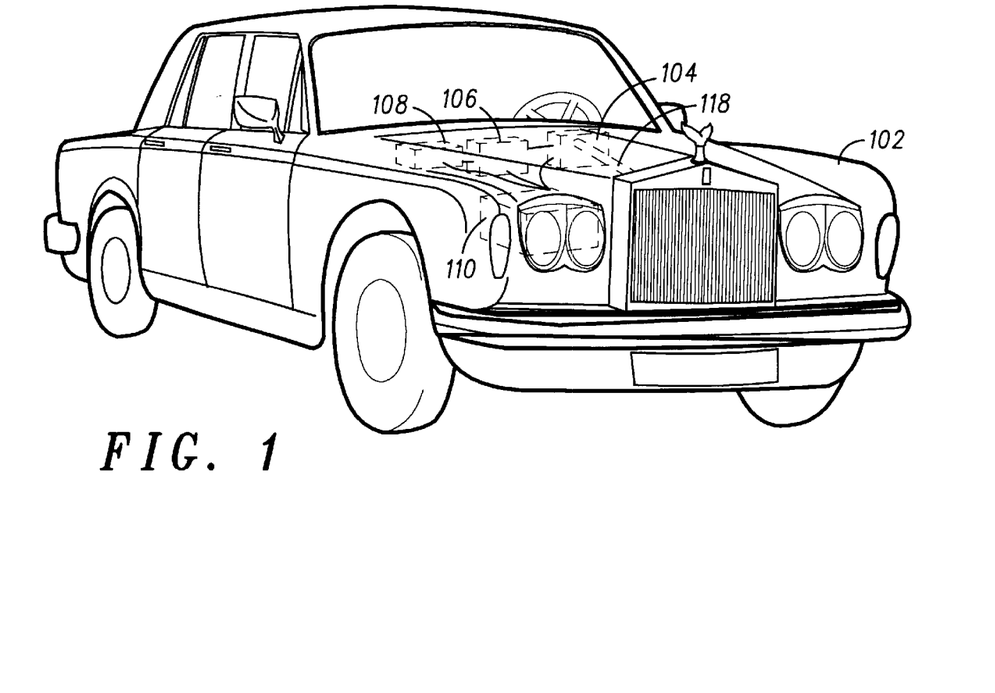
FIG. 1 shows a side view of a vehicle incorporating a first embodiment.
Figure 2:
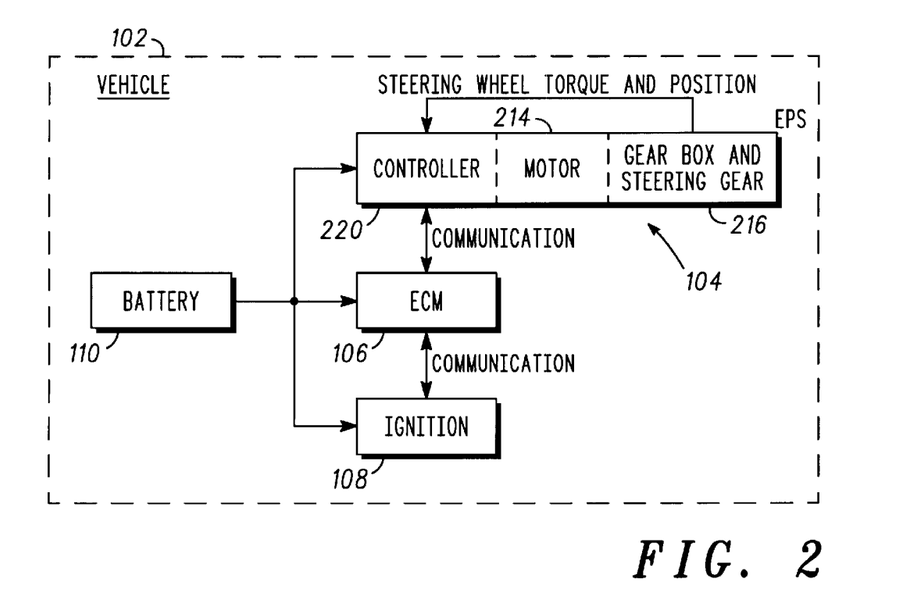
FIG. 2 shows a partial block diagram of the system shown in FIG. 1.

FIGS. 1 and 2 show a vehicle 102 incorporating a first preferred embodiment of the invention. The vehicle 102, which is any device that transports people and/or things, includes an electronic power steering system 104 (EPS), an electronic control module 106 (ECM), an ignition module 108, and a power source or a battery 110. The electronic power steering system 104 includes a controller 220, a motor 214, and a gearbox 216. The gearbox 216 has a plurality of toothed wheels (steering gears) coupled between the steering column 118 and the motor 214. The steering gears operate to transmit and modify the rotary motion and torque of the motor 214 to the steering column 118. The electronic control module 106 is a microcomputer that monitors and controls the driveability and emission functions of an engine. The electronic control module 106 conditions sensor signals that are fed to the power steering system 104 through a serial or a parallel interface. The sensor signals may include vehicle speed signals and an ignition signal, for example.

Figure 3:
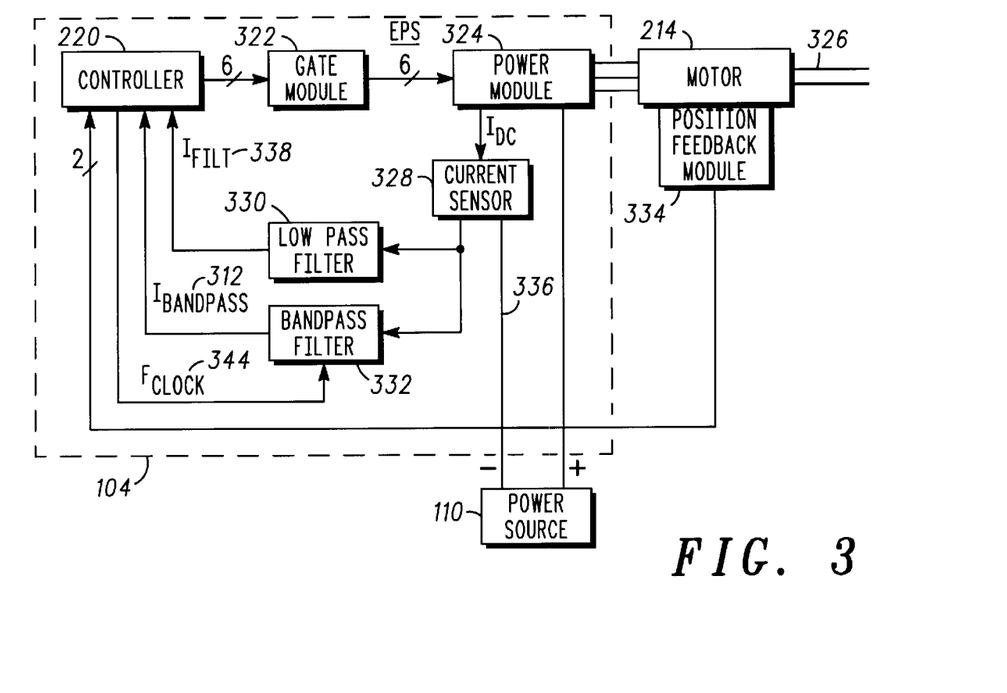
FIG. 3 shows a block diagram of an electronic power steering system of FIG. 2.

As shown in FIG. 3, an electronic power steering system 104 includes the controller 220, a gate module 322, a power module 324, a current sensor 328, a low pass filter 330, and a band pass filter 332 interfaced to the power source 110, the motor 214, and the position feedback module 334. The controller 220 establishes the switching sequence of six power switches (see FIG. 4) found in the power module 324. The switching sequence establishes the desired frequency and amplitude of the motor current. The controller 220 generates six digital pulses, one digital pulse for each power switch. The gate module 322 receives the digital pulses and generates six outputs capable of driving a peak current on the order of 1 Amp. Preferably, a peak current of 1 Amp is sufficient to turn on and turn off the power switches rapidly, maximizing the efficiency of the power module 324.

The controller 220 has a dedicated timer block that in part, generates six pulse-width-modulated signals. The timers are initialized to maintain the modulating frequency of the power module 324 and the timing intervals between the upper 330 and the lower 332 power switches. Three registers, preferably having two outputs, generate the pulse widths for each of the three-inverter legs 334, 336, and 338 shown in FIG. 4. These registers can be loaded periodically depending on the amplitudes and the phase angles of the modulating signals, which are preferably sine waves. In one exemplary embodiment, the registers are loaded at one-millisecond time intervals to generate balanced three-phase currents. In some exemplary embodiments, the phase angles of the three-phase currents preferably coincide with the mechanical angle of the shaft 326, the mechanical angle of the shaft 326 plus 120 degrees, and the mechanical angle of the shaft 326 plus 240 degrees, respectively. The position feedback module 334 preferably monitors shaft 326 position. The modulating signal of each phase is preferably calculated by multiplying the cosine of each phase angle of the three-phase currents by the respective amplitude of the three-phase currents. While the amplitude of the three phase currents can be measured by many applications, preferably a closed loop system that feeds back velocity or torque measurements is used. Thus in some digital exemplary embodiments, three digital values representing the instantaneous modulating signals can be derived. In these digital embodiments, the word lengths of the instantaneous modulating signals will depend on the clock frequency of the electronic power steering system 104 and the switching frequency of the power module 324. Of course, bit scaling can be used in any digital embodiment to adapt data to the operating bus or application of the power steering system 104.

Figure 4:
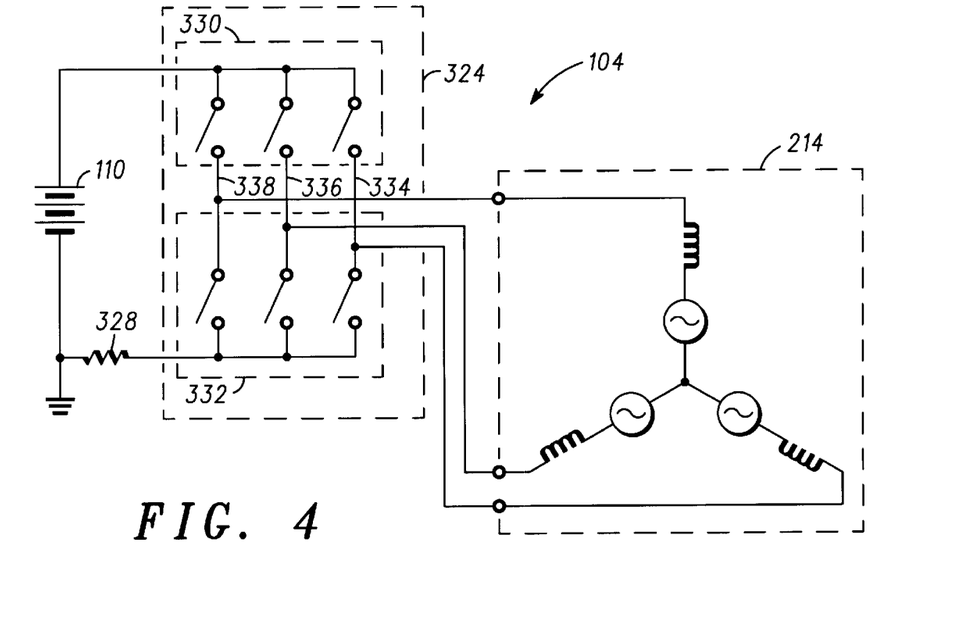
FIG. 4 shows a partial schematic diagram of the electronic power steering system shown in FIG. 3.

The six power switches of the power module 324 are arranged in a three-phase inverter configuration using three inverter legs 334, 336, and 338. In this configuration, two power switches are disposed in series between the current sensor 328 and the power source 110 in each leg. Preferably, a maximum of three switches can be turned on at one instant, with only one switch being active per inverter leg. Preferably, there is a time interval between the opening of one switch in one inverter leg and the closing of a complementary switch in the same leg to allow the current conducting through the one switch to reach approximately zero. The time interval is preferably on the order of about 2% to about 5% of the pulse-width-modulated periodic time. The gate module 322 or the controller 220 may control this time interval in the exemplary embodiments.

It is advantageous to have three phase currents flow through the motor 214 simultaneously such that the instantaneous currents sum to zero, are displaced in phase by 120 degrees, have a sinusoidal shape, and have the same amplitude. In other words, preferably the power module 324 drives balanced three-phase sinusoidal currents. Both the amplitude and frequency of the balanced three-phase currents can be variable depending on the operation of the motor 214 in the application.

The balanced three-phase currents are preferably derived using an open-loop process that does not change unbalanced currents. Of course, closed loop systems are used in other exemplary embodiments. In the closed loop exemplary embodiments, the current that drive each phase is measured or estimated and balanced when needed to maintain balanced currents. In some exemplary embodiments, an additional low pass filter and an additional band pass filter are used to identify shorted motor 214 conditions such as when the impedance of a shorted phase is not noticeably different from an unshorted phase, for example.

As shown in FIG. 3, the battery current sensor 328 is disposed in series between the negative battery terminal or ground and the power module 324. The current sensor 328 measures bi-directional current, and preferably, consumes little power. The output of the current sensor 328 is fed to the low pass filter 330 and the band pass filter 332. The cutoff frequency of the low pass filter 330 is positioned to eliminate interference such as pulse-width modulation noise and other switching noise from the desired signal. The band pass filter 332 is tunable and adjusts its center frequency to coincide with a multiple of the electrical rotational frequency of the motor 214. In one exemplary embodiment, the center frequency of the band pass filter 332 coincides with a frequency that is twice that of the motor 214 electrical rotational frequency. As motor electrical rotational frequency changes, the center frequency of the band pass filter 332 also changes so that the 2:1 relationship is maintained. The electrical rotational frequency of the motor 214 and the mechanical rotational frequency of the motor shaft 326 are related by the number of poles of the motor 214. A two pole motor, for example, has the same electrical and mechanical rotational frequencies, but a four pole motor has an electrical rotational frequency that is about two times greater than its mechanical frequency. Similarly, a six pole motor has an electrical rotational frequency that is about three times greater than its mechanical frequency.

A position feedback module 334 measures the rotation of the motor shaft 326 and generates signals that indicate shaft 326 position. These signals are fed to an input of the controller 220. The position feedback module 334 may track motor shaft grooves through a resolver or modulated light through a photoelectric quadrature encoder, for example. In a photoelectric encoder, a slotted code wheel interrupts the beam of light at a frequency that correlates to the rotation of the shaft 326. The portion of light passing through the code wheel slots is detected and then converted into electrical signals that are sampled by known analog or digital circuitry to determine the angular speed, the direction, and the angular position of the shaft 326. The required accuracy of the position feedback module 334 will depend on the application of the invention, but for the purpose of this exemplary embodiment, a one degree electrical resolution is suggested.

FIG. 4 shows a partial functional diagram of the electronic power steering system 104 illustrating the power source or battery 110, the current sensor 328, a portion of the power module 324, and an equivalent circuit representation of the motor 214. The motor 214 is illustrated in a simplified wye-configuration that includes a balanced back electromotive force and a balanced line inductance. Although a wye-configuration is shown, delta-configurations can also be used in alternative exemplary embodiments.

In FIG. 4, the current sensor 328 is a precision resistor disposed between the power module 324 and ground. The series resistor may be coupled to an amplifier to increase the output signal strength. In other exemplary embodiments, a Hall effect current sensor is used. A Hall effect current sensor provides a relatively noise immune signal, consumes little power, and does not interrupt or attenuate current flow.

The power module 324 of FIG. 4 employs six pulse-width-modulated signals (PWMS) that convert battery power into three phase variable alternating current. In one exemplary embodiment, the pulse width of the output waveform varies sinusoidally with the electrical rotational frequency of the motor 214. The frequency of the pulse-width-modulating signals is known as the carrier frequency. The motor voltage frequency is known as the modulating frequency. In operation, the motor inductance 214 filters out the relatively high frequency pulse-width-modulating carrier frequency. The resulting phase current flows at the modulating frequency. A pulse-width-modulating frequency of twenty kilohertz is used in one exemplary embodiment because this frequency is above the audio detectable range. The frequency and amplitude of the pulse-width-modulating signals, of course, will vary with the intended application of the motor 214. Preferably, the controller 220, the gate module 322, and the power module 322 collectively generate the pulse-width-modulating signals.

Figure 9:
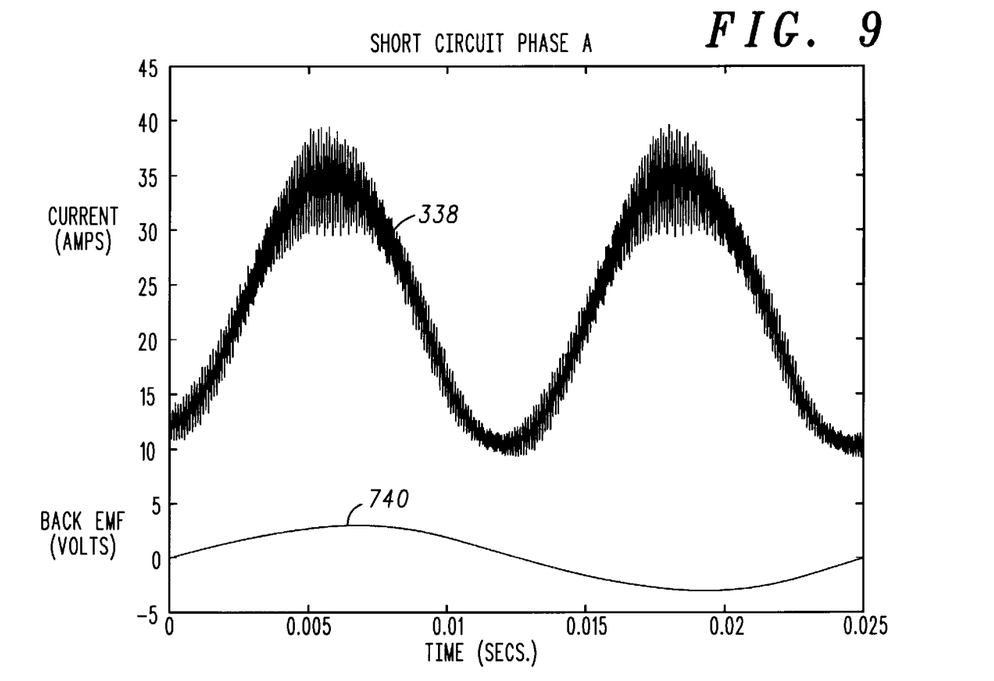
FIG. 9 illustrates the battery current and back electromotive force of FIG. 8.
Figure 10:
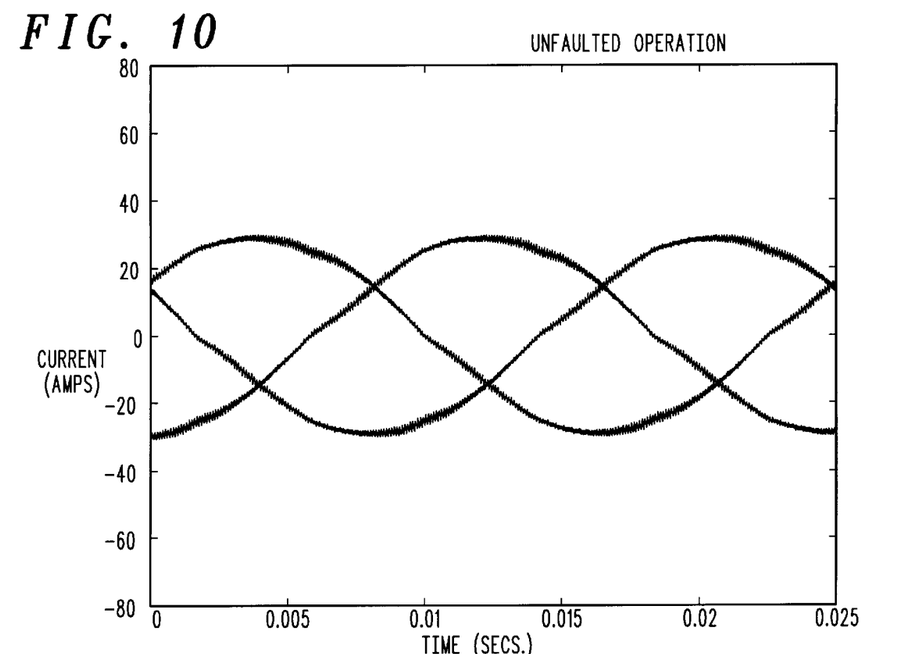
FIG. 10 illustrates the phase currents measured under a normal condition.
Figure 11:
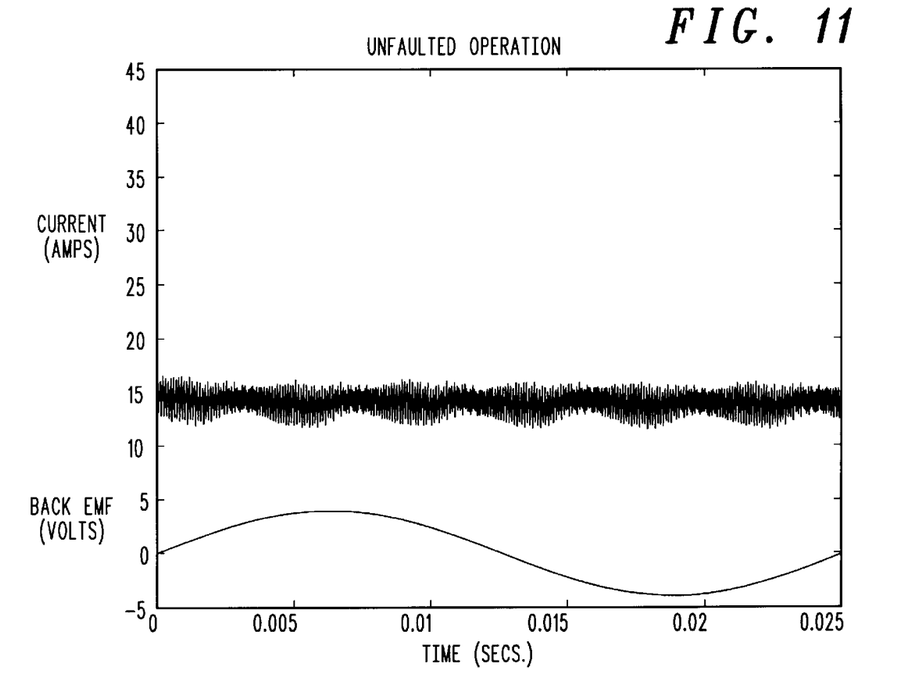
FIG. 11 illustrates the battery current and back electromotive force measured under a normal condition.

To detect a motor fault at low speeds, the controller 220 monitors and samples the battery current sensor 328, which has been filtered using a low-pass filter 330 (see FIG. 3), for a complete electrical cycle using analog-to-digital circuitry or signal processing methods known to those of ordinary skill in the art. Representative plots of normal three-phase currents versus time and normal battery current and back electromotive force versus time are illustrated in FIGS. 10 and 11. FIGS. 6–9 illustrate the currents and voltages measured under short circuit and open circuit fault conditions.

Because a motor fault condition has a frequency component at twice the motor's 214 rotational frequency, the cutoff frequency of the low pass filter 330 is preferably positioned at a frequency that is greater than twice the motor's 214 rotational frequency. After the controller 220 samples $I_{filt}$ 338 for a complete shaft 326 revolution, the sampled current 338, which can be stored in volatile or nonvolatile memory, is compared to an expected value to detect a fault condition. The expected value may be a calculated percentage of a measured current over a fixed time interval, or an expected average current value, or a time average current value (measured during at least one third of an electrical cycle), or a range of current values. The $I_{filt}$ 338 measured during a complete electrical cycle is preferably comprised of two sine waves summed to an average current. The sampled $I_{filt}$ 338 is thus a composite of two current peaks interleaved between two current valleys. It is the deviation of this composite current signal relative to the expected value that identifies a motor fault condition at low speeds. When the shaft 326 position is analyzed using analog technology, the composite current signal is sampled and averaged continuously. The maximum and minimum currents over one cycle may be obtained using peak detector circuits, for example. The output of the peak detector circuits (one circuit for the maximum current and one circuit for the minimum current) can be used to calculate the deviation from the average current. A fault condition is identified when both maximum and minimum current values deviate from the average current value by a pre-determined percentage. The current value stored by these peak detector circuits can be reset to a zero state when the cycle concludes, and thus can acquire successive measurements of the next cycle. When digital technology is used, sample events can be triggered by shaft 326 rotation or can be sampled continuously for the duration of one electrical cycle.

When the motor shaft 326 angular speed exceeds a threshold value, which will vary with the system or method's application or other parameters, the controller 220 monitors and samples the high frequency current, $I_{bandpass}$ 312, shown in FIG. 3, using analog-to-digital circuitry or signal processing methods known to those of ordinary skill in the art. Preferably, the controller 220 switches between the outputs of the low pass filter 330 and the band pass filter 332 using an internal or an external switch circuit. If the bandpass filter 332 is implemented using a switched-capacitor filter, the center frequency of the band pass filter 332 is tuned to a fixed ratio by $F_{clock}$ 344, which is a signal generated by the controller 320. If, for example, the band pass filter 332 has a divider ratio of one hundred to one (100:1), then a ten kilohertz digital signal tunes the center frequency of the band pass filter 332 to one hundred-hertz, which corresponds to a shaft frequency of 50 Hz for a two pole motor. Like a fault condition that occurs at a low speed, a fault condition that occurs at a high speed also has a frequency component. The frequency component can be detected at twice the motor's 214 rotational frequency. Accordingly, the center frequency of the band pass filter 332 is tuned to coincide with twice the motor's 214 rotational frequency.

The output of the bandpass filter is compared to a percentage of the average current ($I_{avg}$) and a fault condition is detected when a threshold value is exceeded. In pseudo-code, the comparison can be described as:

If ($I_{filter}$>0.2*$I_{avg}$)
  indicate-fault;
End if.

In this exemplary embodiment, a 20% value is used to illustrate the comparison. Of course, this percentage or if a range of percentages is used, the range of percentages can change with the application of the invention, and thus should not be considered limiting.

A fault condition is detected when the sampled output current signal 312 of the band pass filter 332 differs from the expected value. Because a fault condition will generate current ripple on the power supply return line 336, the amplitude and frequency of the current ripple is monitored and measured by the controller 220.

Figure 5:
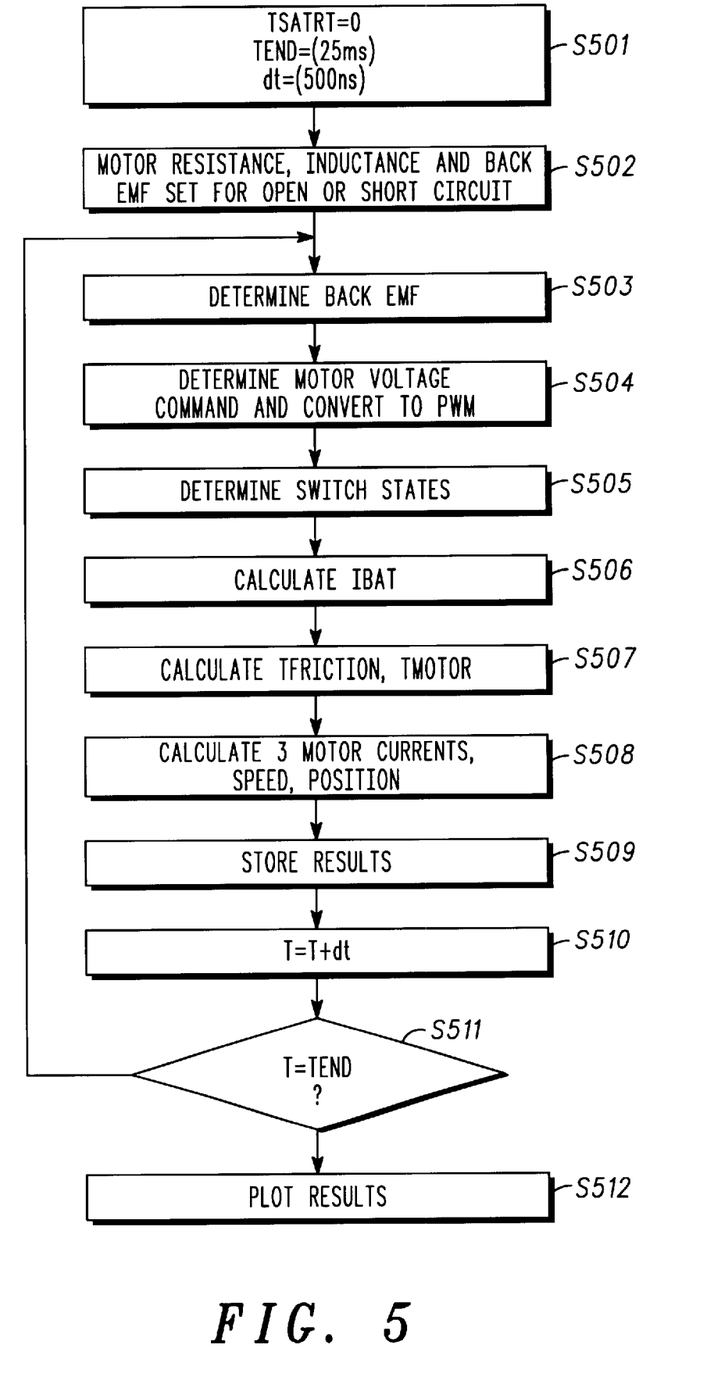
FIG. 5 shows a flow chart simulation of an open circuit and short circuit condition.

FIG. 5 illustrates a flowchart simulation of an open and short circuit motor failure condition. At a step S501, the simulation is initialized. The simulation calculates the phase and battery line currents at five hundred nanosecond time intervals for a time period of twenty five milliseconds. At a step S502, motor resistance, motor inductance, and electromotive force for an open and short circuit are initialized. At a step S503, the back electromotive force of the motor is calculated. At a step S504, the voltage command is translated into six pulse-width-modulating signals. At a step S505, the switch states of the power module are determined. At a step S506, the battery return line current is calculated. At a step S507, the friction and torque of the motor are calculated. At a step S508, the three phase motor currents, the shaft speed, and the shaft position are determined. At steps S509 and S510, the results are stored in volatile or nonvolatile memory and time is incremented. When the end of the simulation is reached, the process proceeds from a step S511 to a step S512 and plots the results. When the end of the simulation is not reached, the process repeats beginning with step S503.

Figure 6:
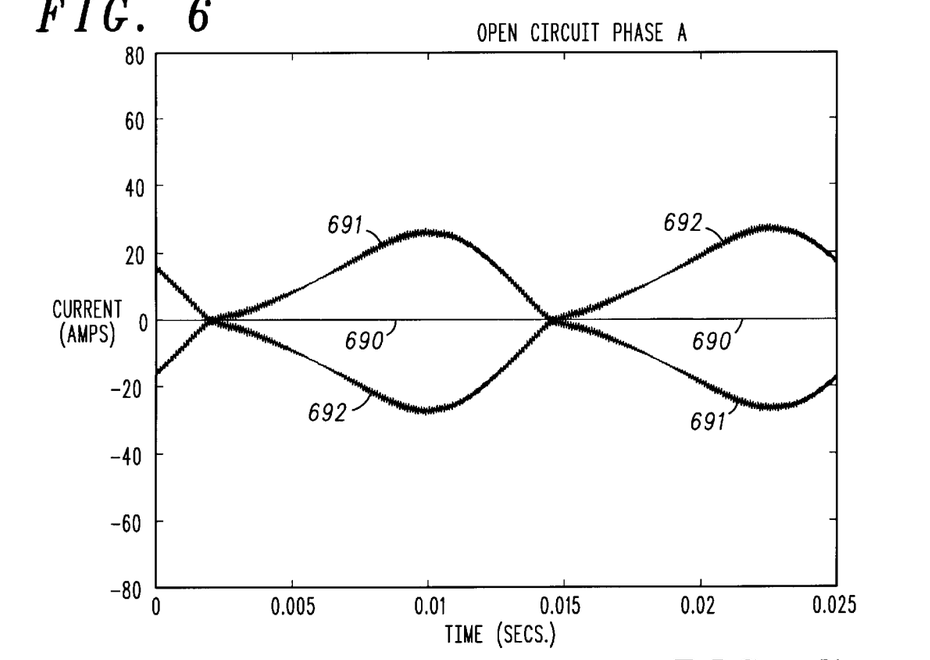
FIG. 6 illustrates the phase currents measured during an open circuit condition as simulated by the process of FIG. 5.
Figure 7:
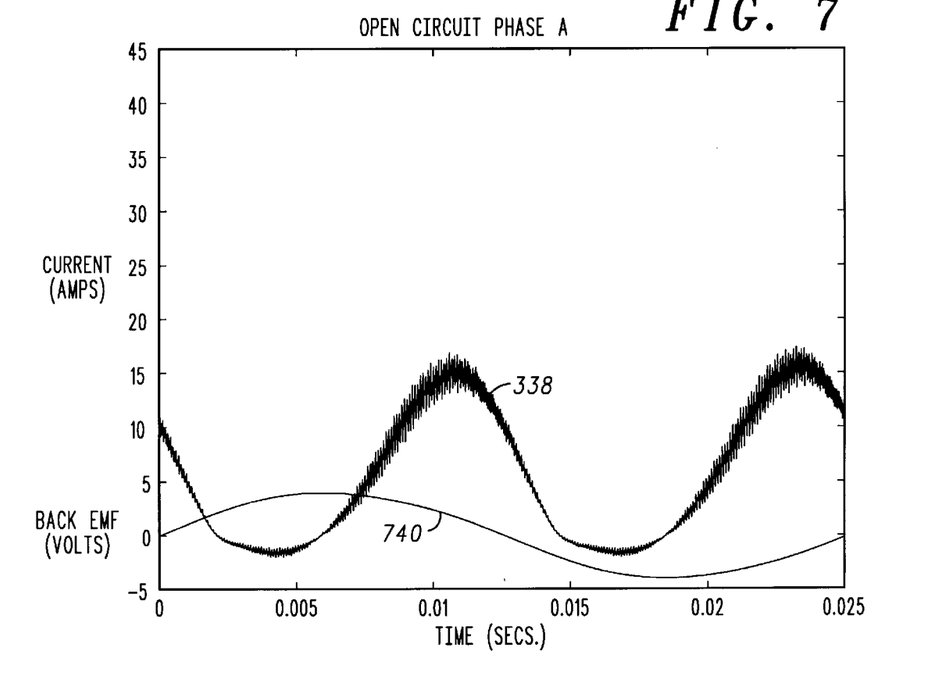
FIG. 7 illustrates the battery current and back electromotive force of FIG. 6.

FIG. 6 shows the phase currents obtained during an open circuit condition of one of the phase currents 690 simulated by the process of FIG. 5. The remaining phase currents 691 and 692 are symmetric with respect to the zero axis because the instantaneous algebraic sum of all three currents is zero at any point in time. FIG. 7 shows the corresponding battery current profile as measured from the battery return line and the back electromotive force 740 is also shown as a reference. In FIG. 7, one complete electrical cycle is shown and $I_{filt}$ 338 has significant current ripple. When $I_{filt}$ 338 is compared to the expected value by the controller 220, an open circuit condition is identified.

Figure 8:
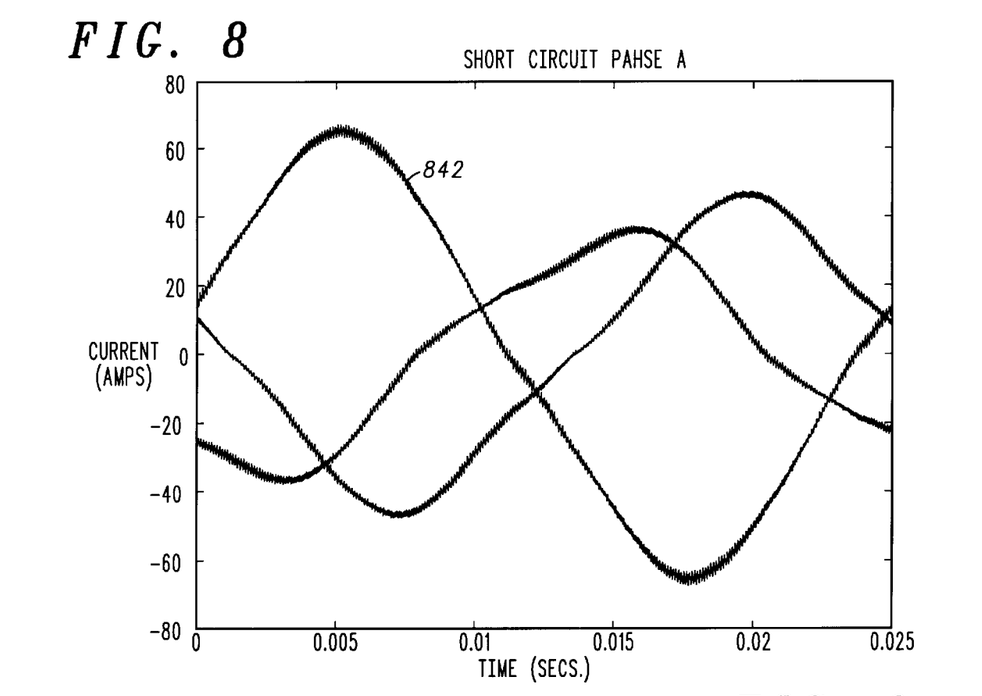
FIG. 8 illustrates the phase currents measured during a partial short circuit condition as simulated by the process of FIG. 5.

FIG. 8 shows the phase currents measured during a partial short circuit condition simulated by the process of FIG. 5. A partial short circuit occurs when an internal motor winding shorts to itself or to another adjacent winding in such a manner as to reduce the winding impedance to a value which is less than the unfaulted winding impedance. Nonetheless, a partial short circuit is not a complete short condition (in which case the impedance of the windings would be practically zero).

As shown in FIG. 8, the phase current 842 flowing through the partially shorted winding has a larger amplitude than the remaining phase currents. FIG. 9, shows the corresponding battery current profile where the back electromotive force 740 is shown for reference purposes. $I_{filt}$ 338 has significant current ripple. When $I_{filt}$ 338 is compared to the predetermined value by the controller 220, a partial short condition is identified.

From the forgoing description, it should be apparent that the low pass filter 330 or the high pass filter 332 can implemented using analog or digital filter designs, just as the controller 220 may implemented using a batch or a real-time processor or a signal processor. Only the band pass filter 332, which can be implemented by electrically coupling an output of a high pass filter to an input of a low-pass filter or by simply using a band pass filter, needs to have a tunable pass band. However, tunable filters can be used exclusively in the system and the method. Furthermore, in certain embodiments the low pass filter 330 is not needed. Of course, motor fault conditions in those exemplary embodiments are detected using the band pass filter 332 or a circuit equivalent at a low and a high motor speed. In another alternative exemplary embodiment, the position feedback module 334 is not needed. In this exemplary embodiment, motor shaft 326 speed is estimated using a real-time model that estimates shaft 326 angular velocity from a measured motor 214 current and a measured motor voltage.

In another exemplary embodiment, the low pass filter 330 and bandpass filter 332 are implemented using software code alone. In this exemplary embodiment, the functionality of the software embodiment is similar to that of the hardware embodiments described above. Preferably, the software programs a dedicated or a general-purpose controller.

Many other alternative embodiments are also possible. The filters 330 and 332 may be implemented using digital or analog filters. Furthermore, the motor 214 need not be limited to a front, a rear, or an all wheel drive power steering application nor be limited to a vehicle 102. The motor 214, can be a direct or an alternating current motor having single or multiple phases. In some alternative embodiments, the controller 220, the filters 330 and 332, the gate module 322, the power module 324, and the current sensor 328 are integrated in a single circuit or a single controller. In other alternative embodiments, the current sensor 328 is disposed between the positive battery terminal and the power module 324. In yet other alternative embodiments, the bus lines identified by the numbers 2, 6, and 6 in FIG. 3 vary with the hardware implementations of the other alternative embodiments.

The above-described system and method detects a motor 214 failure by monitoring or sampling a return current to the power source 110 or ground or a sourced current from the power source 110. The direct current has an alternating current component that correlates to shaft 326 rotation. At a low motor speed, as described in one exemplary embodiment, the direct current is sampled and stored in volatile or nonvolatile memory at a fixed time interval over a complete electrical cycle. After the cycle is complete, an average value is computed and compared to an expected value, such as a moving average that is averaged over one third of an electrical cycle. If the computed average value is not within an expected range of the moving average, a failure condition is detected. At higher speeds, a tunable band pass filter 332 tuned to twice the motor's 214 electrical rotational frequency is used. When the output of the tunable band pass filter 332 is not within an expected range of the moving average, a failure condition is detected.

In another exemplary embodiment, a current amplitude is not stored over one full electrical cycle. Instead the maximum value, the minimum value, and the average value of the current are measured during an electrical cycle. At the end of the electrical cycle, as determined by the position feedback module 334, the deviation of the maximum and the minimum values from the average value are calculated and a fault condition is identified when the deviation exceeds an expected value. If the current values are represented by $I_{max}$, $I_{min}$ and $I_{avg}$, respectively, a representative algorithm may include the following pseudo-code:

If $[(I_{avg}-I_{min})>0.2*I_{avg}$
and $[(I_{max}-I_{avg})>0.2*I_{avg}]$
indicate fault;
end if;

Preferably, a 0.2 factor is used in this exemplary embodiment. The 0.2 factor, of course, will change with other motor 214 applications and thus should not be considered limiting.

The system and method of the invention seamlessly identifies motor 214 failures, such as open and short circuit conditions, at low and high motor 214 speeds. The use of a single direct current sensor 328 disposed serially within a power source line improves the system and method's performance by reducing power consumption, propagation delays, component expense, and the associated assembly cost of the system and method.

The system and method can be implemented, in part, by preferably using a 68HC708MP16 micro-controller available from Motorola, Inc. or a TMS320C240 digital signal processor available from Texas Instrument, Inc.; an IR 2130 gate drive integrated circuit available from International Rectifier, Inc.; a sense resistor available from Vishay; a LM2902 op amp available from National Semiconductor, Inc.; a LTC1059 tracking filter available from Linear Technology, and a #IRFP048N Metal-Oxide-Semiconductor-Field-Effect-Transistors available from International Rectifier.

The foregoing description describes only a few of the many forms that the invention takes, and therefore should be taken as illustrative rather than limiting. It is only the following claims, including all equivalents that are intended to define the scope of the invention.

I claim:

1. A system that detects a fault condition in a three-phase motor comprising:
   a power module having a plurality of switches arranged in a three-phase inverter configuration to provide three phase current flow through the motor;
   a power line connected to the power module;
   a sensor having an input, the input being electrically coupled to the power line;
   a filter electrically coupled to an output of the sensor; and
   a controller having an input and an output electrically coupled to the filter, in which the output of the controller provides a signal to tune the filter to a rotational frequency of the motor, and the input of the controller receives a signal that identifies a fault condition when compared to a predetermined value by the controller.

2. The system of claim 1 in which the sensor comprises a direct current sensor.

3. The system of claim 1 in which the sensor consists of a single direct current sensor that is connected between a negative terminal of a battery and the power module.

4. The system of claim 1 in which the sensor comprises a resistor.

5. The system of claim 1 further comprising a direct current power source having a positive terminal electrically coupled to the controller and a negative terminal electrically coupled to the input of the sensor.

6. The system of claim 1 in which the filter comprises a band pass filter.

7. The system of claim 6 in which the signal provided by the controller tunes the central frequency of the band pass filter.

8. The system of claim 1 in which the filter comprises a band pass filter and a low pass filter.

9. The system of claim 8 which the signal provided by the controller tunes only the central frequency of the band pass filter.

10. The system of claim 1 in which the controller is a micro-controller electrically interfaced to an automotive electronic control module.

11. The system of claim 1 in which the three-phase motor is a power steering motor coupled to an automotive steering column.

12. The system of claim 1 in which the signal that tunes the filter adjusts the frequency of the filter to a multiple of the rotational frequency of the three-phase motor.

13. The system of claim 1 in which the signal that tunes the filter adjusts the frequency of the filter to twice the rotational frequency of the three-phase motor.

14. The system of claim 1 in which the signal received by the controller is first conditioned by the filter.

15. The system of claim 1 in which the fault condition includes a short between the different phases of the three-phase motor.

16. A system that detects a fault condition in a three-phase power steering motor comprising:
   a power source having a positive terminal and a negative terminal, the positive terminal and the negative terminal connected to the three-phase power steering motor through a plurality of switches;
   a current sensor electrically coupled to between the negative terminal of the power source and the plurality of switches;
   a band pass filter electrically coupled to an output of the current sensor; and
   a controller having an input and an output electrically coupled to the band pass filter, in which the output of the controller provides a signal to tune the band pass filter to a rotational frequency of the three-phase power steering motor, and the input of the controller receives a signal that when compared to a predetermined value by the controller identifies the fault condition in the three-phase power steering motor.

17. The system of claim 16 further comprising a low pass filter having an input electrically coupled to the current sensor and an output electrically coupled to a second input of the controller.

18. The system of claim 17 in which the controller comprises a switching circuit that selects one of the outputs of the band pass filter and the low pass filter, respectively, and in which the selected output provides the input signal that when compared to the predetermined value identifies the fault condition in the three-phase power steering motor.

19. The system of claim 18 which the fault condition includes a short between the different phases of the three-phase power steering motor.

20. A method for detecting a fault in a three-phase motor in a vehicle comprising the steps of:
   monitoring a sensor between a the three-phase motor and a direct current power source;
   filtering an output signal provided by an output of the sensor by a band pass filter and a low pass filter;
   selecting an output signal processed by one of the filters based at least in part on the rotational frequency of the three-phase motor; and
   comparing the selected output to a predetermined value to identify when a motor fault occurs.

21. The method for detecting a fault of claim 20 wherein the sensor is a current sensor electrically interconnected between a negative terminal of the power source and the three-phase motor.

22. The method for detecting a fault of claim 20 wherein the sensor is a resistor electrically interconnected between a negative terminal of the power source and the three-phase motor.

23. The method for detecting a fault of claim 20 further comprising the step of measuring the rotational frequency of the three-phase motor.

24. The method for detecting a fault of claim 23 further comprising the step of tuning the central frequency of the band pass filter to a measured rotational frequency of the three-phase motor.

25. The method for detecting the fault of claim 23 further comprising the step of tuning the central frequency of the band pass filter to a frequency that is twice the measured rotational frequency of the three-phase motor.

26. The method for detecting a fault of claim 20 wherein the three-phase motor is a direct current or alternating current power steering motor and the comparing step comprises comparing the selected output to a value stored in a memory device.

27. The method for detecting a fault of claim 20 wherein the method is an iterative process.

28. A controller usable medium having a controller readable program code embodied therein to detect a fault condition in a three-phase motor in a vehicle, the controller readable program code comprising:
   a first controller readable code to determine the condition of current flowing through a power line between the three-phase motor and a power source; and
   a second controller readable code to indicate when a fault condition occurs in response to an output of the first controller readable code and a predetermined value.

29. The controller usable medium of claim 28 wherein the predetermined value is a range of values.

30. The controller usable medium of claim 28 wherein the second controller readable code further comprises a comparison of a maximum measured current and a minimum measured current with a predetermined value.

* * * * *